United States Patent
Hubauer et al.

(10) Patent No.: US 11,340,599 B2
(45) Date of Patent: May 24, 2022

(54) MONITORING APPARATUS AND METHOD FOR MONITORING A SYSTEM

(71) Applicant: Siemens Aktiengesellschaft

(72) Inventors: Thomas Hubauer, Garching Bei Munchen (DE); Martin Ringsquandl, Rosenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 170 days.

(21) Appl. No.: 16/629,473

(22) PCT Filed: Jul. 9, 2018

(86) PCT No.: PCT/EP2018/068578
§ 371 (c)(1),
(2) Date: Jan. 8, 2020

(87) PCT Pub. No.: WO2019/011877
PCT Pub. Date: Jan. 17, 2019

(65) Prior Publication Data
US 2020/0142390 A1    May 7, 2020

(30) Foreign Application Priority Data

Jul. 10, 2017 (DE) .......................... 102017211737.0

(51) Int. Cl.
G05B 23/02 (2006.01)

(52) U.S. Cl.
CPC ..... *G05B 23/0221* (2013.01); *G05B 23/0286* (2013.01); *G05B 2219/37325* (2013.01)

(58) Field of Classification Search
CPC ............ G05B 23/0221; G05B 23/0286; G05B 2219/37325; G05B 23/02; G01D 3/08;
(Continued)

(56) References Cited

U.S. PATENT DOCUMENTS

| 6,122,577 A | 9/2000 | Mergenthaler et al. |
| 6,556,939 B1 * | 4/2003 | Wegerich ................. G01D 3/08 |
| | | 702/127 |

(Continued)

FOREIGN PATENT DOCUMENTS

| DE | 19636443 A1 | 3/1998 |
| DE | 19902939 A1 | 3/2000 |

(Continued)

OTHER PUBLICATIONS

Decision to Grant in corresponding Russian Patent Application No. 2020105672 dated Jul. 15, 2020. 57 pages.
(Continued)

*Primary Examiner* — Mohammad K Islam
(74) *Attorney, Agent, or Firm* — Schmeiser, Olsen & Watts LLP

(57) ABSTRACT

The monitoring of a technical system using sensor data. In the event of the failure of a sensor, in this case, for the failed sensor, virtual sensor data are created on the basis of the remaining functional sensors. In this case, the sensors for the calculation of the virtual sensor data are selected in two stages. In a first step, firstly, possible candidates of sensors are ascertained on the basis of a knowledge-based approach and the topology of the system. A second step involves calculating a mathematical relationship between the sensor data of a faulty sensor and the possible candidates of sensors for the calculation of the virtual sensor data. Those sensors which form a suitable basis for the calculation of the virtual sensor data can be identified in this way.

15 Claims, 1 Drawing Sheet

(58) Field of Classification Search
CPC .......... G01D 18/00; G01D 21/00; H04Q 9/00; H04Q 2209/10; H04Q 2209/86
See application file for complete search history.

(56) References Cited

U.S. PATENT DOCUMENTS

| | | |
|---|---|---|
| 2005/0065744 A1 | 3/2005 | Cataltepe et al. |
| 2008/0133118 A1 | 6/2008 | Brueckner et al. |
| 2008/0312756 A1* | 12/2008 | Grichnik ............ G05B 19/0423 700/29 |
| 2009/0216827 A1* | 8/2009 | Hirase ................ G05B 23/0221 709/201 |
| 2011/0098975 A1* | 4/2011 | Mazzaro ................ G01D 18/00 702/183 |
| 2013/0079955 A1 | 3/2013 | Masiello et al. |
| 2013/0173028 A1* | 7/2013 | Felty ...................... G05B 13/02 700/79 |
| 2014/0025338 A1* | 1/2014 | Blount ................ G05B 19/406 702/183 |
| 2017/0046309 A1 | 2/2017 | Hubauer et al. |
| 2018/0025558 A1* | 1/2018 | Chen ................ B60W 50/0205 701/29.7 |

FOREIGN PATENT DOCUMENTS

| | | |
|---|---|---|
| DE | 102004033954 A1 | 10/2005 |
| DE | 102009032265 A1 | 1/2011 |
| DE | 102014208034 A1 | 10/2015 |
| EP | 2182327 A1 | 5/2010 |
| RU | 121944 U1 | 11/2012 |
| RU | 2530316 C2 | 10/2014 |
| WO | 2019011877 A1 | 1/2019 |

OTHER PUBLICATIONS

Examination Report for German Patent Application No. 10 2017 211 737.0, dated Apr. 12, 2018. 5 pages.
PCT Patent Application No. PCT/EP2018/068578 filed Jul. 9, 2018, International Search Report and Written Opinion of the International Searching Authority dated Nov. 7, 2018. 12 pages.
Decision to Grant for German Patent Application No. 10 2017 211 737.0, dated Dec. 12, 2018. 13 pages.
Examination Report in related Indian Patent Application No. 202017000818 dated Jun. 3, 2021. 5 pages.

* cited by examiner

MONITORING APPARATUS AND METHOD FOR MONITORING A SYSTEM

CROSS-REFERENCE TO RELATED APPLICATIONS

This application claims priority to PCT Application No. PCT/EP2018/068578, having a filing date of Jul. 9, 2018, based on DE 10 2017 211 737.0, having a filing date of Jul. 10, 2017, the entire contents of both are hereby incorporated by reference.

FIELD OF TECHNOLOGY

The following relates to a monitoring apparatus and to a method for monitoring a system. In particular, the following relates to a monitoring apparatus for evaluating sensor data.

BACKGROUND

Modern technical systems are equipped with a multiplicity of sensors. These sensors generally detect all relevant system states. The current state of the system to be monitored can be ascertained on the basis of the output signals of the sensors. An adapted open-loop control or closed-loop control of the system by means of the output values of the sensors is thus possible. In particular, critical system states can also be derived from the output values of the sensors. Such a critical system state may necessitate for example an intervention in the sequence of events in the system or else, if appropriate, a complete or partial shutdown of the system.

For safe operation of such a system, it is necessary here that the data provided by the sensors be present as far as possible completely and with high reliability. In the event of erroneous or possibly missing sensor data, the reliability of the control or the detection of critical operating states may possibly not be ensured with sufficient reliability.

On account of the high number of sensors in a system, it is possible here, under certain circumstances, in the event of the failure of a sensor, to derive the data of this sensor from the data of further sensors of the system. Various approaches exist for this purpose.

By way of example, relationships between the individual sensor data can be identified in an approach based on statistics. For this purpose, for example, a statistical relationship, such as a correlation, for example, can be calculated in each case in pairs for the data from two sensors. If a high correlation results here for two sensors, then there is a strong relationship between the sensor data of the two sensors, such that in the event of the failure of one of the two sensors, the data of the other sensor can be derived in each case by the sensor that is still functioning. What is disadvantageous here for this approach is that a statistical value has to be calculated individually beforehand for each pairing of sensors. On account of the high number of sensors in a system, this necessitates great computing power with correspondingly complex and expensive hardware.

Alternatively, sensor data related to one another can also be identified by means of a knowledge-based approach. However, this necessitates very detailed knowledge of the system to be monitored. This knowledge is generally gained from human knowledge. Therefore, for each system that is to be newly designed, it is once again necessary to create a suitable knowledge base. This requires a very detailed analysis of the system and a high degree of human assistance. Such concepts are therefore likewise very complex and also error-prone on account of the human factor.

There is therefore a need for the monitoring of a system with a plurality of sensors in which, in the event of a fault occurring in one of the sensors, the data of the failed sensor can be reconstructed particularly reliably and rapidly from the sensor data still available.

SUMMARY

An aspect relates to a monitoring apparatus comprising a receiving device and an evaluation device. The receiving device is designed to receive sensor data from a plurality of sensors. The evaluation device is designed to detect a fault in a first sensor of the plurality of sensors. Furthermore, the evaluation device is designed to calculate virtual sensor data that replace the sensor data of the faulty first sensor. The evaluation device in this case, for the calculation of the virtual sensor data, firstly ascertains a list of sensor candidates from the plurality of sensors. The evaluation device determines a respective similarity value for each sensor of the sensor candidates. The evaluation device thereupon calculates virtual sensor data for the faulty first sensor using the sensor data of the sensor having the highest similarity value.

Another aspect relates to an apparatus for monitoring a system comprising a plurality of sensors, a monitoring apparatus according to the invention and a control device. The plurality of sensors are designed in each case to provide sensor data. The provided sensor data of a sensor correspond here in each case to a detected measurement value in the system. The control device is designed to control the system using the received sensor data and the calculated virtual sensor data.

An other aspect relates to a method for monitoring a system. The system comprises the steps of receiving sensor data from a plurality of sensors and detecting a fault in a first sensor of the plurality of sensors. Furthermore, the method comprises a step for ascertaining a list of sensor candidates from the plurality of sensors and a step for determining a similarity value for each sensor in the list of sensor candidates. Finally, the method comprises a step for calculating virtual sensor data. In this case, the virtual sensor data replace the sensor data of the faulty first sensor. In this case, the virtual sensor data are calculated using the sensor data of the sensor having the highest similarity value.

Embodiments of the invention are based on the insight that in the case of a system comprising a multiplicity of sensors, in the event of the failure of a sensor, the sensor data can usually be reconstructed from the further sensor data. In this case, however, the identification of suitable alternative sensors from which missing and/or erroneous sensor data can be reconstructed is associated with a very high complexity. This high complexity thus makes the conception of a reliable system more difficult and more expensive.

Embodiments of the present invention is based, therefore, on the concept of taking account of this insight and providing monitoring of a system in which alternative sensor data for the reconstruction of missing and/or erroneous data can be identified in as simple and nevertheless reliable a manner as possible. For this purpose, the embodiments of the present invention provide a two-stage approach. In a first step, an existing system can firstly be analyzed structurally and functionally. In this way, functional and structural relationships which can serve as an initial basis for alternative sensor sources can be identified in a relatively simple method. The number of possible candidates of sensors which serve as an initial basis for the reconstruction of sensor data can already be greatly restricted as a result. Afterward, in a further step, the relationships of the sensor data of the individual candidates can be calculated by means of a statistical/mathematical analysis. If strong relationships between the data of two sensors are identified in this case, then in the event of one of the sensors failing, the respective other sensor can be used as a basis for the reconstruction of the erroneous sensor data.

Ascertaining candidates of sensors from whose data the sensor data of the faulty sensor can be reconstructed in the event of the failure of a sensor can be based on any suitable analysis of the system. By way of example, a structural and/or functional description of the system can be stored in a database or some other suitable storage unit. Functional, structural and spatial relationships between the individual sensors in the system can be identified on the basis of this structural and/or functional description of the system. If a volumetric flow rate is monitored, for example, then all sensors involved in this monitoring of the volumetric flow rate can be put into a relationship. On the other hand, other sensors not involved in the monitoring of such a volumetric flow rate can be disregarded, with the result that the number of sensors for the subsequent second step can be reduced. Furthermore, already existing knowledge from similar systems designed earlier can also be concomitantly included in the creation of the list of possible sensor candidates. In principle, it is moreover also possible for further sources of knowledge also to be used for creating the sensor candidate list.

The list of sensor candidates can be created as early as during the conception of the system. Moreover, during the normal course of operation, too, the list of sensor candidates can be established, created or else adapted if appropriate depending on an operating state or modifications at the system. Since the creation of the list of sensor candidates is independent of the ongoing operation of the system, only a low computing power is required for creating the list of sensor candidates. In particular, the creation of the list of sensor candidates is not a time-critical process since a high computing power is not required for real-time applications.

In the further course of events, a respective similarity value can be ascertained afterward for the potential candidates from which the data of a faulty sensor could be able to be reconstructed in the case of a fault. By way of example, a function describing a measure of a similarity between the data of two sensors can be defined for this purpose. In particular, for example, a correlation or cross-correlation between the data of two sensors can be calculated. The higher the similarity, in particular the correlation, between the data of two sensors, the more strongly the data of the two sensors are related to one another. In the event of the failure of the data of one of the two sensors, in this case, given a high similarity, in particular a strong correlation, the data of the faulty sensor can be reconstructed relatively well from the data of the sensor still functioning.

The system to be monitored can be any desired system, in particular any desired technical system. In this regard, technical installations which produce an end product from one or more starting materials or products are possible as system, for example. By way of example, a process installation of a chemical process can be involved here. Moreover, any desired production installations for the wholly or partly automatic manufacture of products are also possible as system. Such a system can comprise for example a manufacturing installation for a domestic appliance, or any other production installation. Furthermore, the system can also be for example a power plant such as a gas- or coal-fired power plant, for example. Moreover, the system to be monitored can optionally also be only part of such a production installation or of a power plant. By way of example, the system to be monitored can also be only a turbine of a power plant. Moreover, any desired further systems are also possible, however, which can be monitored and controlled with a plurality of systems.

The detection of the fault in the first sensor can be effected in any desired manner. By way of example, the received sensor data can be checked for consistency. If the received sensor data lie above and/or below predefined limit values, then this may be an indication of a faulty sensor, for example. Moreover, the received sensor data can also be compared with sensor data already received previously and a possible fault can be deduced if there is an excessively great deviation. In one simple case, a malfunction of the sensor can already be deduced from the absence of sensor data provided. Furthermore, it is also possible, however, to receive an additional signal indicating a possible fault in one of the sensors. The term "first sensor" here serves merely to differentiate this sensor from the further sensors. A first sensor here can be an arbitrary sensor of the system from the plurality of sensors of the system.

In accordance with one embodiment, the monitoring apparatus comprises a storage device. In this case, the evaluation device can be designed to store the received sensor data from the plurality of sensors in the storage device. Furthermore, the evaluation device can calculate the similarity values using the stored sensor data which were stored before the detection of a fault in the first sensor. In particular, for the calculation of the similarity values it is possible to use the stored sensor data of a predetermined time window or time interval for the calculation of the similarity values.

In accordance with one embodiment, the monitoring apparatus comprises a database. The database can be designed to store and to provide information about the plurality of sensors. The evaluation device can create the list for the sensor candidates using the information about the plurality of sensors that is provided by the database. By way of example, information about functional relationships of the individual sensors can be stored in the database. Moreover, spatial and/or structural relationships between the individual sensors can also be stored in the database. Furthermore, any desired further additional indications about the system and in particular about the individual sensors in the system can also be stored in the database. This information can be entered into the database for example automatically or optionally also wholly or partly manually. A knowledge base about the system and the sensors contained therein can be provided in this way. In particular, by way of example, a quality measure in association with the respective sensor can also be stored for each sensor in the database. Said quality measure can specify for example an indication about the tolerance range of the sensor data or any desired other parameter for the quality of the sensor data. It is also possible to derive therefrom, in particular during the reconstruction of virtual sensor data for a faulty sensor, indications about the reliability and/or tolerance of the virtual sensor data generated.

In accordance with one embodiment, the evaluation device ascertains the sensor candidates using spatial, structural or functional relationships of the individual sensors in the system. In this way, the number of potential sensor candidates in a system comprising numerous sensors can already be greatly restricted by the evaluation of the known relationships of the sensors.

In accordance with one embodiment, the evaluation device generates a computation specification for calculating the virtual sensor data from the sensor data of the sensor(s) from which the virtual sensor data can be derived. In this way, the virtual sensor data, in the case of a fault, can be calculated very rapidly from the sensor data still available.

In accordance with one embodiment, calculating the virtual sensor data comprises calculating a reliability value for the calculated virtual sensor data. In particular, the reliability value can be calculated for example using the calculated similarity value and/or a quality of the sensor data that is defined in association with the sensors. A measure of the quality of the virtual sensor data can be calculated in this way. Accordingly, it is possible to adapt the further control and monitoring of the system by means of the virtual sensor data in accordance with the calculated reliability value.

In accordance with one embodiment of the method for monitoring a system, calculating the similarity value between two sensors comprises the calculation of a correlation between the two sensors, in particular between the first sensor identified as faulty and a candidate of the further sensors. Moreover, any desired further functions and computation specifications for the definition of variables which describe a relationship between the data of two sensors are also possible.

In accordance with one embodiment, ascertaining the list of sensor candidates is already carried out before detecting a fault in the first sensor. In this way, the list of sensor candidates is already available upon the detection of a fault, with the result that a suitable sensor which can be taken as a basis for calculating the alternative virtual sensor data for the faulty sensor can subsequently be identified very rapidly. In this case, the list of sensor candidates can be created for example just once during the conception of the system. Moreover, it is also possible to adapt the list of sensor candidates in the case of a modification of the system and/or depending on an operating state of the system.

In accordance with one embodiment, the method comprises a step for storing the received sensor data of the plurality of sensors. In this case, determining the similarity value can be effected using the stored sensor values which were received before a fault was detected in the first sensor. In this way, suitable error-free sensor data are available for the calculation of the similarity values. In particular, the calculation of the similarity values between two sensors can be effected on the basis of sensor data that were received within a predetermined time interval or time window.

The above configurations and developments can, insofar as is practical, be combined with one another in any desired manner. Further configurations, developments and implementations of the invention also encompass not explicitly mentioned combinations of features of the invention described above or below with respect to the exemplary embodiments. In particular, the person skilled in the art will also add individual aspects as improvements or supplementations to the respective basic forms of the present invention.

BRIEF DESCRIPTION OF THE DRAWINGS

Some of the embodiments will be described in detail, with reference to the following figures, wherein like designations denote like members, wherein.

DETAILED DESCRIPTION

Figure 1:
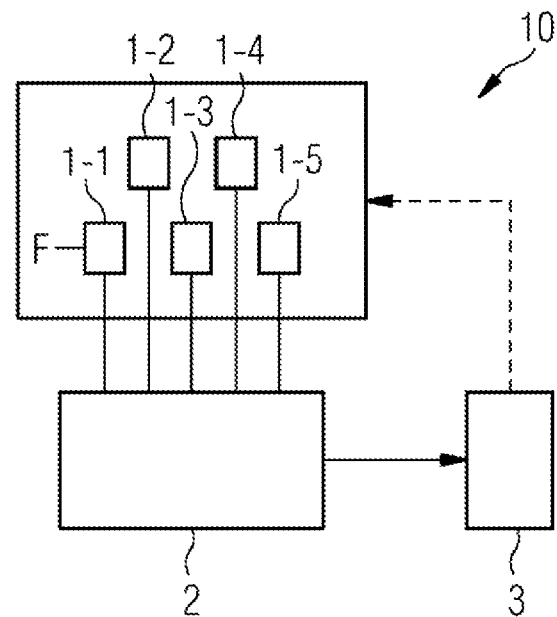
FIG. 1: shows a schematic illustration of a system to be monitored in accordance with one embodiment.

FIG. 1 shows a schematic illustration of a system 10 to be monitored. The system 10 to be monitored can be any desired system to be monitored. By way of example, the system 10 can be a production installation, a production line, a power plant or else only part thereof. By way of example, the system 10 can also be a turbine or some other part to be monitored of a power plant. Likewise, part of a production installation, such as, for example, a reaction container or the like, can also be monitored for example as system 10. A plurality of sensors 1-$i$ are provided in the system 10. Each of these sensors 1-$i$ can for example monitor one or more parameters of the system 10 and provide sensor data corresponding to the monitored parameter(s). By way of example, the sensors 1-$i$ can detect in each case a temperature, a pressure, a volumetric flow rate, a moisture, a concentration of a predetermined substance in a volume, a filling amount, a length, such as, for example, a distance or an extent, an intensity, such as, for example, a light or radiation intensity, an electrical variable, such as, for example, a voltage, a current, a power, etc., or any desired other physical variable. The sensor data provided by the sensors 1-$i$ can be provided as analog or digital values, for example. In particular, by way of example, the sensor data can be provided as digital data. In this case, it is possible to provide the data for each sensor separately via a suitable connection at a monitoring apparatus 2. It is likewise possible for the data of a plurality of sensors to be provided via a common data bus at the monitoring apparatus 2. Any suitable bus system is possible for this purpose.

The monitoring apparatus 2 receives the sensor data from the sensors 1-$i$. If a fault occurs in a sensor F and, consequently, no or only erroneous sensor data can be provided by said sensor F, then the monitoring apparatus 1 reconstructs the sensor data of this faulty sensor F and provides virtual sensor data for this faulty sensor F. Afterward, the control device 3 of the system 10 can control the system by open-loop or closed-loop control using the sensor data from the sensors 1-$i$ and optionally using the virtual sensor data for the faulty sensor F. In particular, in this case, the control device 3 can also identify if appropriate critical operating states of the system 10 on the basis of the sensor data from the sensors 1-$i$ and optionally the virtual sensor data. If such a critical operating state has been identified in the system 10 on the basis of the sensor data 1-$i$ and optionally the virtual sensor data, then suitable signaling, for example, can be effected afterward. The signaling can be output as an optical and/or acoustic signal. Likewise, it is also possible to output an analog or digital signal, on the basis of which the control of the system 10 can be adapted or else, if appropriate, the system 10 can be wholly or partly stopped in the event of a critical operating state occurring.

For a safe operating procedure, it is of great importance here that precisely such critical operating states are identified reliably. By way of example, if the procedure of the system 10 is not adapted in a timely manner in the event of a critical operating state occurring, then this can result in a situation of considerable danger in the system 10. If, on the other hand, for example on account of insufficient sensor data, a critical operating state of the system 10 is ascertained even though such a critical operating state of the system 10 is not present, then this can result in a complete or partial failure of the system 10, which can be associated for example with considerable costs on account of a stoppage of the system 10. Therefore, it is of great importance always to have available a sufficient set of data on the basis of the sensor data from the sensors 1-$i$.

Therefore, in the event of a fault occurring in a sensor F, the monitoring apparatus 2 of the system 10 can reconstruct virtual sensor data that can be used instead of the actual sensor data of the faulty sensor F. In this case, said virtual sensor data can be calculated from the sensor data of one or else optionally a plurality of further sensors 1-$i$ of the system 10. The function of the monitoring apparatus 2 is explained in greater detail below.

Figure 2:
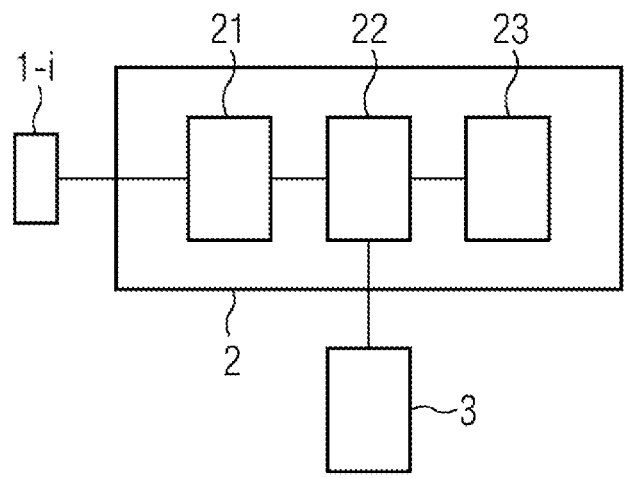
FIG. 2: shows a schematic illustration of a monitoring apparatus in an apparatus for monitoring a system in accordance with one embodiment.

FIG. 2 shows a schematic illustration of a monitoring apparatus 2 such as can be used in a system 10. The monitoring apparatus 2 comprises at least one receiving device 21 and an evaluation device 22. Furthermore, the monitoring apparatus 2 can also comprise a database 23 and optionally further components. The receiving device 21 receives the sensor data of the sensors 1-$i$ of the system 10. The received sensor data are thereupon provided at the evaluation device 22. The evaluation device 22 can detect for example a fault in the sensor data of a sensor F. By way of example, the evaluation device 22 can compare the received sensor data with an upper and/or lower threshold value. If the sensor data exceed and/or fall below the predefined threshold value(s), then this can indicate a malfunction of the corresponding sensor 1-$i$. Furthermore, the time profile of the values of the sensor data can also be evaluated in order to deduce a malfunction of the corresponding sensor 1-$i$ in the event of a deviation of the time profile from predefined criteria. Alternatively, it is also possible for the evaluation device 22 to receive an additional signal that signals a malfunction of the corresponding sensor 1-$i$. This signal can be any desired analog or digital signal suitable for indicating a malfunction of the corresponding sensor 1-$i$.

If the evaluation device 22 establishes that a malfunction of a sensor F is present, then the evaluation device 22 calculates virtual sensor data for the faulty sensor F from the sensor data of one or a plurality of further sensors 1-$i$. Said virtual sensor data can be used for the further processing instead of the actual sensor data of the faulty sensor F. Accordingly, the control of the system 10 and, in particular, the detection of if appropriate critical operating states of the system 10 can be effected on the basis of the sensor data and the calculated virtual sensor data.

For the calculation of the virtual sensor data, the evaluation device 22 firstly determines which sensor data from further sensors 1-$i$ of the system 10 are able to be taken as a basis for calculating virtual sensor data for the faulty sensor 1-$i$ as accurately and reliably as possible. For this purpose, in a first step, firstly a list of possible candidates of sensors is ascertained. In a further step, for these ascertained candidates of sensors 1-$i$, a respective value is determined which specifies a measure of the relationship between the faulty sensor F and the respective candidate. Afterward, the virtual sensor data can be calculated from sensor data from the further sensor(s) 1-$i$ which have a particularly strong relationship with the sensor data of the faulty sensor F.

Possible candidates of sensors 1-$i$ can be ascertained for example by means of an analysis of specifications regarding the system 10. These specifications can for example be stored in the database 23 and be provided by the database 23. By way of example, the functional relationships of the individual sensors 1-$i$ with respect to one another can be evaluated. In this regard, for example, a plurality of sensors 1-$i$ connected with a common process step can be regarded as mutually associated. If the system 10 comprises a reaction container, for example, then all sensors which detect variables connected with said reaction container can be regarded as being associated with a common group. Moreover, for example, the data from sensors which detect a plurality of variables of a volume flow in a pipeline can be regarded as mutually associated. Moreover, it is also possible to form any desired other sensor groups for a system 10. In particular, it is possible, for example, to specify the sensors 1-$i$ in the system in a hierarchical structure. In this case, for example, sensors which all belong together at a higher hierarchical level can be regarded as a group of sensors. In this case, the grouping of the sensors can either be based on functional relationships, that is to say that sensors which detect variables of a common function of the system 10 can be combined as a group, or the grouping of the sensors can for example also be based on structural or spatial arrangements in the system 10, that is to say that sensors arranged in a common spatial region of the system 10 can be regarded as a common group. Moreover, it goes without saying that any other suitable groupings of sensors 10 are also possible.

The grouping of the sensors 1-$i$ for forming possible candidates of sensors 1-$i$ from whose data virtual sensor data for a failed sensor F can be calculated can moreover also be effected in any other manner desired. By way of example, possible candidates can also be defined and stored as early as during the conception of the system 10. In particular, in this case it is possible to use any desired knowledge-based approaches for forming possible candidates of sensors. By way of example, a semantic analysis of the specification of the system 10 for identifying possible candidates of sensors 1-$i$ is also possible. In this case, the list of possible candidates of sensors 1-$i$ can be ascertained wholly or else optionally partly automatically by means of any desired suitable methods. By way of example, algorithms based on fuzzy logic can also be used for identifying possible candidates of sensors 1-$i$.

The list of possible candidates of sensors 1-$i$ which can be used as an initial basis for the calculation of virtual sensor data for a faulty sensor 1-$i$ can be implemented here once during the conception of the system 10. Moreover, it is also possible to adapt the list of candidates of sensors 1-$i$ after the conception of the system 10. For example, in the case of a modification of the system 10, the list of possible candidates of sensors 1-$i$ can be adapted in accordance with the modification. An adaptation of the list of possible candidates of sensors 1-$i$ depending on the respective operating state of the system 10 is also possible.

What is crucial here, however, is that creating the list of possible candidates of sensors 1-$i$ for the calculation of virtual sensor data for a specific sensor 1-$i$ can already be effected before a fault occurs in the corresponding sensor 1-$i$. Therefore, ascertaining the list of possible candidates of sensors 1-$i$ is not a time-critical process, and so creating the list of possible candidates of sensors 1-$i$ can be carried out with a relatively low processing power. The ascertained list of candidates of possible sensors can thereupon be stored and kept ready in a storage unit of the evaluation device 22.

In the case of the possible candidates of sensors 1-$i$ from whose sensor data virtual sensor data for a sensor F can be calculated in the event of a fault, it is possible to take as a basis here in each case an identical physical parameter. That is to say, for example, that for the reconstruction of a temperature, it is possible to use the sensor data from further temperature sensors. Moreover, it is also possible in principle, however, that virtual sensor data for one physical parameter can be calculated on the basis of sensor data for other physical parameters. In this regard, by way of example, in the event of the failure of a temperature sensor, if appropriate, a temperature can also be derived from sensor data from sensors for other physical parameters such as, for example, pressure, flow rate, etc.

If the evaluation device 22 establishes that there is a fault in one of the sensors 1-$i$, then the evaluation device 22 thereupon ascertains which sensor data can be taken as a basis for calculating possible virtual sensor data in the most suitable way. For this purpose, firstly, for each possible candidate of a sensor 1-$i$ from the previously created list of sensor candidates, the evaluation device 22 can determine a value indicating a measure of the relationship between the possible candidate of a sensor 1-$i$ and the faulty sensor F. Such a value is referred to hereinafter as similarity value. For example, such a similarity value can be calculated from a correlation between the sensor data of the faulty sensor 1-$i$ and the sensor data of the possible candidate. In this case, a high correlation having an absolute value of close to one denotes a high correspondence between the sensor data of the faulty sensor 1-$i$ and the sensor data of the possible candidate. By contrast, a small value of close to zero describes a very low correspondence of both sensor data.

For the calculation of the similarity value, in this case, it is possible to use in particular sensor data before the detection of a fault in one of the sensors F. For this purpose, by way of example, sensor data of the sensors 1-$i$ can be stored in each case continuously or at predetermined points in time. If a fault is detected in a sensor F, then the previously stored sensor data can be used to calculate therefrom the similarity values between the individual sensors 1-$i$. In particular, in this case, a time window or time interval can be predefined from which the sensor data are used for the calculation of the similarity values. Depending on the application, the time interval can be in the range of microseconds, milliseconds, seconds, minutes, hours or days.

After a similarity value between the sensor values of the candidates and the sensor data of the faulty sensor F has been calculated for all possible candidates of sensors 1-$i$, at least one sensor 1-$i$ can be selected whose sensor data are taken as a basis for calculating possible virtual sensor data for the faulty sensor F. For this purpose, by way of example, the sensor data of a further sensor 1-$i$ that is still functional can be used to calculate therefrom the virtual sensor data for the faulty sensor 1-$i$. Alternatively, it is also possible to use the sensor data of a plurality of sensors 1-$i$ that are still functional in order to calculate therefrom virtual sensor data for the faulty sensor F.

In this case, from the stored sensor data before the occurrence of a fault in the faulty sensor F, it is also possible to derive a relationship between the sensor data of the sensor F that has become faulty in the meantime and the sensor data of the sensor(s) on the basis of which the virtual sensor data are intended to be calculated. It is possible to derive therefrom a computation specification for calculating the virtual sensor data from the sensor data of the functional sensors 1-$i$.

Furthermore, it is also possible to assign a measure of a quality in each case to the sensors 1-$i$. This measure of the quality can describe for example an accuracy of the sensor data of the respective sensor 1-$i$. Moreover, further parameters for the specification of the quality of the respective sensors 1-$i$ or of the sensor data from the respective sensors 1-$i$ are also possible. This measure of the quality of the sensor data can likewise be concomitantly included in the selection of a sensor from whose sensor data the virtual sensor data are intended to be calculated. In this regard, by way of example, in the case of identical or similar similarity values of two potential candidates of sensors 1-$i$, it is possible to select the sensor having a suitable value for the quality of the sensor data.

Furthermore, it is also possible to derive a measure of the quality of the virtual sensor data from the specified values of the quality of the sensor data. In this way, the virtual sensor data can be classified accordingly. By way of example, if it is possible to calculate only virtual sensor data having a relatively low quality, while the original sensor data, which in the meantime have become erroneous, however, had a high quality, then the control of the system 10 can also be adapted afterward on the basis of the ascertained quality of the virtual sensor data. In particular, it is also possible to adapt the criteria for the identification of critical operating states on the basis of the sensor data if the quality of the virtual sensor data deviates from the quality of the original sensor data. If it must be expected for example that the virtual sensor data describe only a temperature with a high tolerance, while the original temperature sensor ascertained sensor data specifying the temperature with a high accuracy, then if appropriate a critical operating state can already be established at a correspondingly lower temperature in order to derive corresponding measures therefrom.

Alternatively, open-loop or closed-loop control regions of the system 10 can also be adapted in accordance with the quality of the virtual sensor data.

Figure 3:
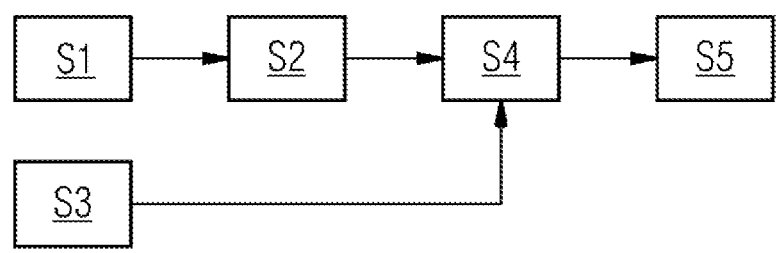
FIG. 3: shows a schematic illustration of a flow diagram such as forms a basis of a method for monitoring a system in accordance with one embodiment.

FIG. 3 shows a schematic illustration of a flow diagram such as is taken as a basis for a method for monitoring a system 10 in accordance with one embodiment. In step S1, firstly, sensor data from a plurality of sensors 1-$i$ are received. In step S2, a fault can be detected in at least one sensor F of the plurality of sensors 1-$i$. The detection can be effected, as already described above, on the basis of the received sensor data or else optionally a direct fault detection in the sensor 1-$i$. In step S3, possible candidates of sensors 1-$i$ are ascertained from whose sensor data, if appropriate, sensor data for the faulty sensor F can be derived. In this case, the possible sensor candidates can be ascertained as early as before the detection of a fault in a sensor 1-$i$, in particular as early as during the conception of the system 10 or during normal operation of the system 10. In step S4, similarity values are calculated, wherein a similarity value is calculated in each case for each pairing between the faulty sensor F and possible candidates of sensors. The calculation of the similarity values is effected here in particular on the basis of sensor data before the detection of the fault in a sensor F. For this purpose, as likewise already described above, it is possible to store the sensor data before the occurrence of the fault.

In step S5, virtual sensor data are calculated for the faulty sensor. These virtual sensor data can replace the sensor data of the faulty sensor in further process steps. The virtual sensor data are calculated here using the sensor data with the highest similarity value. Optionally, it is also possible to use sensor data from a plurality of sensors 1-$i$ with a correspondingly high similarity value for the calculation of the virtual sensor data.

The system 10 can subsequently be controlled on the basis of the sensor data, wherein the sensor data of the faulty sensor are replaced by the virtual sensor data. In this case, the control of the system 10 can in particular also encompass a detection of critical operating states.

The invention claimed is:

1. A monitoring apparatus, comprising:
a receiving device designed to receive sensor data from a plurality of sensors; and
an evaluation device designed to detect a fault in a first sensor of the plurality of sensors, and to calculate virtual sensor data that replaces the sensor data of the faulty first sensor,
wherein the evaluation device, for the calculation of the virtual sensor data, ascertains a list of sensor candidates from the plurality of sensors, determines a respective similarity value for the sensor candidates and calculates the virtual sensor data for the faulty first sensor using the sensor data of the sensor having a highest similarity value.

2. The monitoring apparatus as claimed in claim 1, wherein the evaluation device is designed to store the received sensor data from the plurality of sensors, and wherein the evaluation device calculates the similarity values using stored sensor data which were stored before a detection of a fault in the first sensor.

3. The monitoring apparatus as claimed in claim 1, further comprising a database designed to provide information about the plurality of sensors, and wherein the evaluation device is designed to create the list for the sensor candidates using the information about the plurality of sensors that is provided in the database.

4. The monitoring apparatus as claimed in claim 1, wherein the evaluation device is designed to ascertain the sensor candidates using spatial or functional relationships of the individual sensors.

5. The monitoring apparatus as claimed in claim 1, wherein the evaluation device is designed to create a computation specification for calculating the virtual sensor data from the sensor data of the sensor having the highest similarity value.

6. The monitoring apparatus as claimed in claim 1, wherein calculating the virtual sensor data comprises calculating an actual reliability value for the calculated virtual sensor data.

7. An apparatus for monitoring a system, comprising:
a plurality of sensors designed in each case to provide sensor data corresponding in each case to a detected measurement value;
a monitoring apparatus as claimed in claim 1; and
a control device designed to control the system using the received sensor data and the calculated virtual sensor data.

8. The monitoring apparatus as claimed in claim 1, wherein the evaluation device is designed to ascertain the sensor candidates using functional relationships of the individual sensors.

9. A method for monitoring a system, comprising:
receiving sensor data from a plurality of sensors;
detecting a fault in a first sensor of the plurality of sensors;
ascertaining a list of sensor candidates from the plurality of sensors;
determining a similarity value for each sensor in the list of sensor candidates, and
calculating virtual sensor data that replace the sensor data of the first sensor, wherein the virtual sensor data are calculated using the sensor data of the sensor having the highest similarity value.

10. The method as claimed in claim 9, wherein determining the similarity values comprises a calculation of a correlation between sensor data of the first sensor and sensor data of the sensor candidates.

11. The method as claimed in claim 9, wherein ascertaining the list of sensor candidates is carried out before detecting a fault in the first sensor.

12. The method as claimed in claim 9, wherein a quality value is assigned to each sensor in the list of sensor candidates, and wherein a reliability value is calculated for the virtual sensor data using the quality values.

13. The method as claimed in claim 9, wherein the method furthermore comprises a step for storing the received sensor data of the plurality of sensors, and wherein determining the similarity value is carried out using the stored sensor data which were received before detecting a fault in the first sensor.

14. The method as claimed in claim 13, wherein determining the similarity value is carried out using stored sensor data within a predetermined time window.

15. The method as claimed in claim 9, further comprising ascertaining the list of sensor candidates using functional relationships of the individual sensors.

* * * * *